Figure 1:
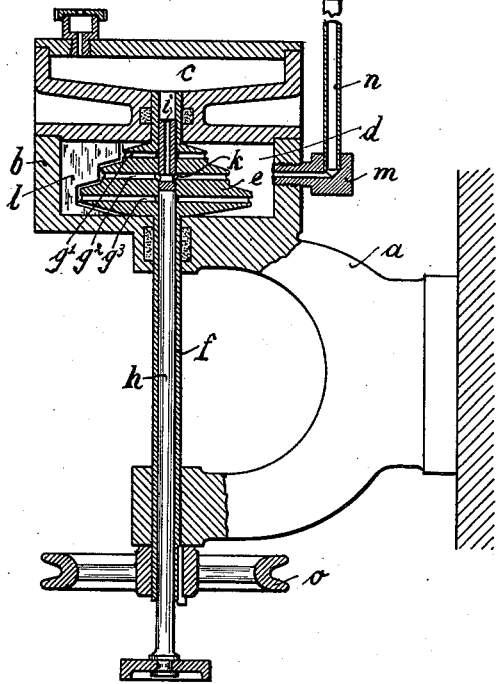

F. E. WOLF.
SPEED MEASURING INSTRUMENT.
APPLICATION FILED APR. 7, 1910.

1,008,510.

Patented Nov. 14, 1911.

UNITED STATES PATENT OFFICE.

FRANZ EMIL WOLF, OF NOWAWES, NEAR POTSDAM, GERMANY.

SPEED-MEASURING INSTRUMENT.

1,008,510. Specification of Letters Patent. Patented Nov. 14, 1911.

Application filed April 7, 1910. Serial No. 553,916.

*To all whom it may concern:*

Be it known that I, FRANZ EMIL WOLF, engineer, a subject of the King of Prussia, residing at Nowawes, near Potsdam, Germany, have invented certain new and useful Improvements in Speed-Measuring Instruments; and I do hereby declare the following to be a full, clear, and exact description of the invention, such as will enable others skilled in the art to which it appertains to make and use the same.

My invention relates to improvements in speed measuring instruments, and more particularly to that class of speed measuring instruments in which the centrifugal force of a rotating liquid, such for example as mercury, is used for measuring the speed. The centrifugal action can be produced either by means of radially disposed threads of the liquid which are inclosed within a rotating body, or by the rotation of the container of the liquid. In the former case the pressure produced by the centrifugal action is transmitted to the liquid contained within the receptacle, while in the second case the static pressure set up by the revolving rotating liquid within the receptacle is transmitted to the measuring device proper through the inner body for which purpose the latter is provided with radial channels. In known speed measuring apparatus of this class, such as are at present in use, the liquid which is independently movable within the receptacle performs a rotary motion of its own which is different under varying conditions, and which can not be held within definite limits. However, this motion of the liquid and the additional centrifugal action produced thereby is a source of errors in the indications of the measuring device, so that the speed measuring instruments in which such additional motion of the liquid takes place are unsuitable for performing exact measurements.

The object of the improvements is to provide a speed measuring instrument which is not subject to erroneous indications. And for this purpose, I construct the instrument in such a way, that the aforesaid injurious rotary motion of the liquid is avoided. In the preferred form I provide one or more partitions within the space provided between the inner body and the wall of the receptacle, which partitions are disposed within the receptacle in a radial or substantially radial position, so as to prevent a motion of the liquid relatively to the receptacle. Thereby the pressure of the liquid caused by the centrifugal action is exactly proportional to the speed of the rotating body, and it can therefore be used for exact measurements.

For the purpose of explaining the invention several examples embodying the same have been shown in the accompanying drawings in which the same letters of references have been used in all the views to indicate corresponding parts.

Figure 3:
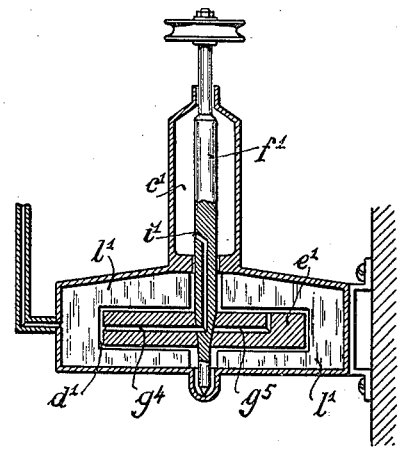
Figure 2:
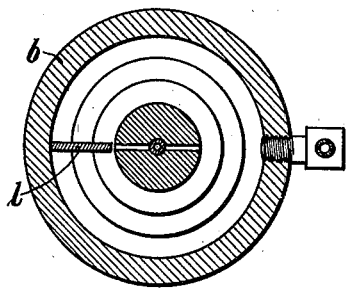
Figure 4:
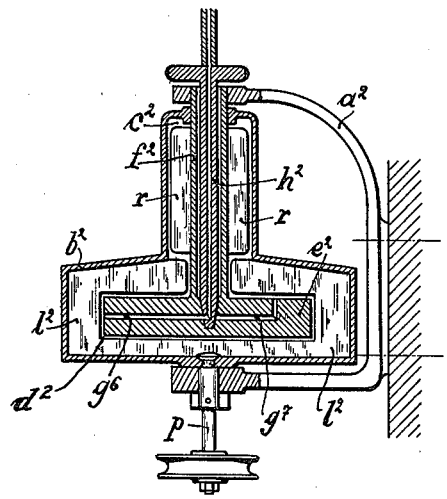

In said drawings—Figure 1, is a vertical cross-section of a speed measuring instrument embodying the invention, the said measuring instrument comprising a stationary casing and a rotating inner body, Fig. 2, is a horizontal section of the casing of the apparatus illustrated in Fig. 1, Fig. 3, is a vertical cross-section showing a modification of the apparatus illustrated in Figs. 1 and 2, and Fig. 4, is a vertical cross-section of a measuring apparatus comprising a rotary casing and a stationary inner body.

Referring to the example of the measuring apparatus illustrated in Figs. 1 and 2, a stationary casing $b$ is mounted on a suitable bracket $a$. It is formed with two chambers $c$ and $d$. The upper chamber $c$ is designed for storing the liquid, and the lower chamber $d$ contains a rotating body $e$. The latter is secured to a hollow shaft or arbor $f$, and it is formed with three sections of different diameters and each of said sections is formed with radial channels $g^1$, $g^2$, and $g^3$. Within the hollow shaft $f$ a spindle $h$ is located which is longitudinally shiftable therein and which is formed at its upper end with a longitudinal bore $i$ and with transverse bores $k$, which are adapted to register with the inner ends of either of the channels $g^1$, $g^2$, $g^3$. Within the chamber $d$ a partition $l$ is provided which as nearly as possible extends through the whole area of the free portion of the said chamber, and which extends closely to the rotating body $e$. If desired a plurality of such partitions may be provided. To the chamber $d$ a perpendicular tube $n$ is secured by means of a tubular stud $m$, and through the said tube the pressure produced by the centrifugal action is transmitted to the indicating device. The latter may be for example a manometer.

The function of the apparatus is as follows: From the member the speed of which is to be ascertained, the body $e$ is rotated by means of a pulley $o$ or the like which is secured to the hollow arbor $f$. Thereby a centrifugal action is produced within the liquid contained within the radial channels $g^1$, $g^2$, $g^3$, and the said centrifugal action produces a pressure within the chamber $d$ which is used for measuring the speed of the rotation. The body of the liquid which is inclosed within the chamber $d$ and which comes in contact with the outer surface of the rotary body $e$ is liable to be taken along by friction. But its rotary motion is prevented by the partition $l$, so that no motion of its own can be imparted to the said body of liquid. Therefore the pressure within the chamber $d$ corresponds exactly to the centrifugal action set up within the radial channels of the rotary body $e$.

By means of the shiftable spindle $h$ either one of the channels or sets of channels $g^1$, $g^2$, or $g^3$ are brought into communication with the chamber $c$, and the said adjustment can be performed at will. As for the same numbers of revolutions the shorter channels have smaller speeds at their outer ends, and therefore produce lower pressures than the longer channels, by throwing either one of the channels or sets of channels $g^1$, $g^2$, or $g^3$ into communication with the chamber $c$ by the proper adjustment of the spindle $h$ the measuring device can be set for different ranges of measurements, that is to say, if the speed is so high, that the longest channels can not be used any more in combination with the measuring device or the scale provided on the same, the spindle $h$ is shifted so as to throw a set of shorter channels into communication with the chamber $c$, and at the same time to throw the set of longest channels out of operation. Thereby the circumferential speed of the end or ends of the indicating channels is varied while the angular speed is not varied. In the same way the apparatus can be adjusted in such a way that the shortest channels are operative.

In the example illustrated in Fig. 3 the arbor $f'$ which carries the rotary body $e'$ projects upward from the said body and through the chamber $c'$. The chamber $d'$ is provided with two partitions $l'$, $l'$ which embrace the rotary body $e'$ and prevent the liquid from being taken along by friction. The rotary body $e'$ is constructed in the form of a disk and it is provided with two radial bores $g^4$ and $g^5$ which are disposed within the same plane. The spindle $f'$ is rotatable within the disk $e'$ and it is formed with an inner bore $i'$ which communicates at its upper end with the chamber $c'$, and which with its lower end can be thrown into communication with the channel $g^4$ or $g^5$ by rotating the spindle $f'$. The operation of the apparatus is the same as that described with reference to Figs. 1 and 2, rotation of the liquid within the chamber $d'$ being prevented by the partitions $l'$, $l'$. By means of the channels $g^4$ and $g^5$ different ranges of measurements are possible.

In the example illustrated in Fig. 4, a stationary inner body is provided which by means of a stationary hollow shaft $f^2$ is supported on a bracket $a^2$. It is provided with a plurality of channels $g^6$ and $g^7$ the mouths of which are at different distances from the perpendicular axis of the disk. The body $e^2$ is inclosed within a casing $b^2$ adapted to be rotated from the member the speed of which is to be ascertained by means of a shaft $p$. Within the shaft $f^2$ a spindle $h^2$ is located which is formed with a longitudinal bore adapted to be thrown into register with either one of the bores $g^6$ or $g^7$ and to connect the same with a suitable measuring device, such for example as a manometer.

It will be remembered, that in the examples illustrated in Figs. 1 to 3 the partitions $l$ and $l'$ have the function to prevent rotation of the body of the liquid inclosed within the casing $b$. In the example shown in Fig. 4 similar partitions $l^2$ are provided which, however, have the function to take the liquid along upon rotation of the casing $b^2$. Therefore, by the said partitions I am enabled to prevent the liquid from being retarded by its friction on the outer face of the stationary inner body $e^2$, which retardation would cause erroneous indications of the instrument.

By reason of the partitions $l^2$ the liquid inclosed within the pressure chamber $d^2$ is always carried along at the speed of the casing $b^2$, and the pressure produced within the said chamber by centrifugal action is transmitted through either one of the channels $g^6$ or $g^7$ and the bore of the spindle $h^2$ to a measuring device, such for example as a manometer. As the static pressure is in direct proportion to the speed of the revolution of the liquid, it decreases toward the axis of the instrument. Therefore, by means of the channels $g^6$ and $g^7$ of different radial lengths different ranges are provided for the measurements.

In order to prevent the liquid contained within the upper chamber $c^2$ from taking part in the rotation of the casing $b^2$ and thereby to adjust its surface along a paraboloid, I prefer to provide partitions $r$ which are secured to the stationary shaft $f^2$. The chambers $c'$ and $c^2$, Figs. 3 and 4, respectively, serve as storage chambers and the fluid mass in them acts as a buffer to take up shocks due to sudden changes of speed and other causes. Thereby the construction of the instrument is particularly simple, and its operation is very easy, so that it can be operated at a minimum of energy.

I claim herein as my invention:

1. In a rotary speed measuring instrument the combination with a casing, and an armless body inclosed by said casing and having a substantially radial bore communicating externally with the inside of the casing, said casing and body having a relative rotary movement and inclosing a liquid, of means to counteract friction between the inner body and the liquid inclosed within the casing, and means to measure the pressure produced by centrifugal action within said liquid.

2. In a rotary speed measuring instrument the combination with a casing, and an armless body inclosed by said casing and having a substantially radial bore communicating externally with the inside of the casing, said casing and body having a relative rotary movement and inclosing a liquid, of a partition disposed within said casing between the inner wall of the same and the outer surface of said body, and means to measure the pressure produced by centrifugal action within said liquid.

3. In a rotary speed measuring instrument the combination with a casing, and a body inclosed by said casing and having substantially radial bores communicating externally with the inside of the casing at different distances from the axis of the instrument, said casing and body having a relative rotary movement and inclosing a liquid, of means to measure the pressure produced by centrifugal action within said liquid at either one of the outer ends of said radial bores.

4. In a rotary speed measuring instrument, the combination with a casing, a body inclosed by said casing and having a plurality of substantially radial bores communicating externally with the inside of the casing at different distances from the axis of the instrument, said casing and body having a relative rotary movement and inclosing a liquid, of a spindle adapted to close all but one of the bores at their inner ends, and means to measure the pressure produced at the outer end of the open bore.

In testimony whereof I affix my signature, in presence of two witnesses.

FRANZ EMIL WOLF.

Witnesses:
HENRY HASPER,
WOLDEMAR HAUPT.